United States Patent [19]
Sato

[11] Patent Number: 5,220,648
[45] Date of Patent: Jun. 15, 1993

[54] HIGH-SPEED SEARCH SYSTEM FOR IMAGE DATA STORAGE

[75] Inventor: Minoru Sato, Yokohama, Japan

[73] Assignee: Kabushiki Kaisha Toshiba, Kawasaki, Japan

[21] Appl. No.: 528,611

[22] Filed: May 25, 1990

[30] Foreign Application Priority Data

| May 31, 1989 | [JP] | Japan | 1-138888 |
| May 31, 1989 | [JP] | Japan | 1-138890 |
| May 31, 1989 | [JP] | Japan | 1-138907 |

[51] Int. Cl.$^5$ .................................... G06F 15/62
[52] U.S. Cl. ........................... 395/146; 395/155; 395/162
[58] Field of Search .............. 395/144, 115-117, 395/164, 166

[56] References Cited

U.S. PATENT DOCUMENTS

| 4,491,874 | 1/1985 | Yamamoto | 358/296 |
| 4,931,957 | 6/1990 | Takagi et al. | 395/164 X |
| 5,018,078 | 5/1991 | Urabe et al. | 395/164 |

FOREIGN PATENT DOCUMENTS 2219674A 12/1989 United Kingdom .

OTHER PUBLICATIONS

Image Filing System Capable of Quick Retrieval, Saito Inoue; NHK Laboratories, No. 328, Feb. 1986, pp. 1 and 3-12.

Image/Text Retrieval System On A Lan, M. Sato et al.; IEEE Computer Society Office Automation Symposium Apr. 27-29, 1987, pp. 200-204.

Primary Examiner—Gary V. Harkcom
Assistant Examiner—Almis Jankus
Attorney, Agent, or Firm—Finnegan, Henderson, Farabow, Garrett & Dunner

[57] ABSTRACT

A high-speed search system for an image data storage system, which comprises a device for storing images, each of the images being identified by search information data and an image number, wherein each image is defined as a numbered page, with the pages constituting a numbered file, and with the files being stored in the storing device, a first control circuit for selecting each of the files which correspond to specified search information data, a device for selecting target images to be searched, a circuit for searching the storing device for the target image selected by the selecting device, a device for displaying the images searched by the searching circuit, a device for designating the manner of presentation of the images by the display device, a second control circuit for selecting from the storing device the image number of the images relevant to the searched image based on the manner designated by the designating device, and a circuit for enabling the display device to display the image represented by the image number selected by the second control circuit.

14 Claims, 15 Drawing Sheets

SCREEN SCROLLING

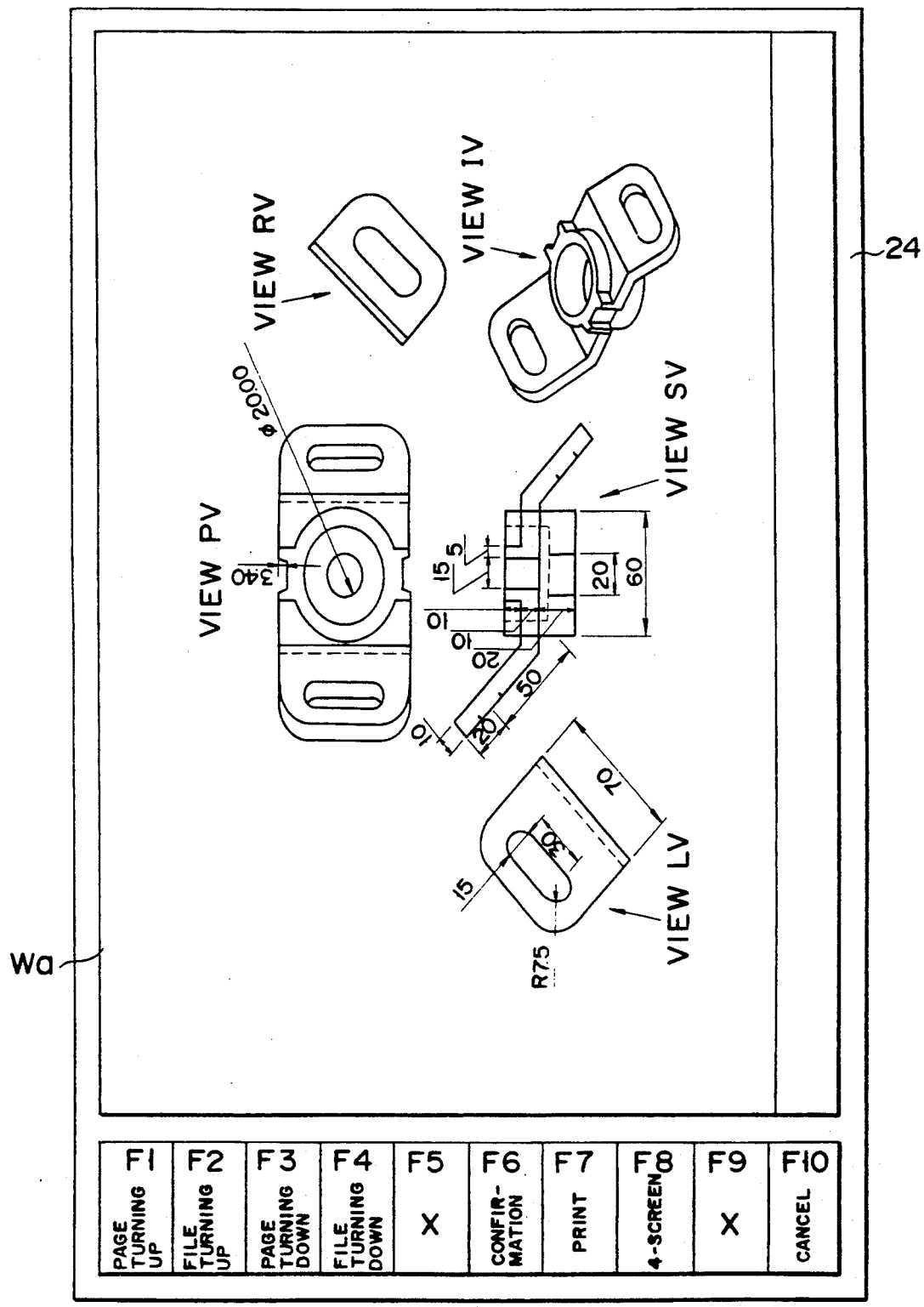
F I G. 7

| F1 | F2 | F3 | F4 | F5 | F6 | F7 | F8 | F9 | F10 |
|---|---|---|---|---|---|---|---|---|---|
| PAGE TURNING UP | FILE TURNING UP | PAGE TURNING DOWN | FILE TURNING DOWN | X | X | X | X | STOP | X |

TITLE MANAGEMENT TABLE 26a

| (NAME OF IMAGE) | SEARCH INFORMATION FILE NUMBER |
|---|---|
|  | 1 |
|  | 2 |
|  | 3 |
|  | 4 |
|  | ⋮ |

FIG. 10A

PAGE MANAGEMENT TABLE 26b

| FILE NO. | PAGE NO. | REC. NO. |
|---|---|---|
| 1 | 1 | 1 |
| 1 | 2 | 2 |
| 1 | 3 | 3 |
| 2 | 1 | 4 |
| ⋮ | ⋮ | ⋮ |

FIG. 10B

RECORD MANAGEMENT TABLE 26c

|  | STORED ADDR. | IMAGE SIZE. | IMAGE ATTR. | SEARCH FREQ. |
|---|---|---|---|---|
| RECORD 1 |  |  |  | 10 |
| RECORD 2 |  |  |  | 5 |
| RECORD 3 |  |  |  | 7 |
| RECORD 4 |  |  |  |  |
|  |  |  |  | ⋮ |

FIG. 10C

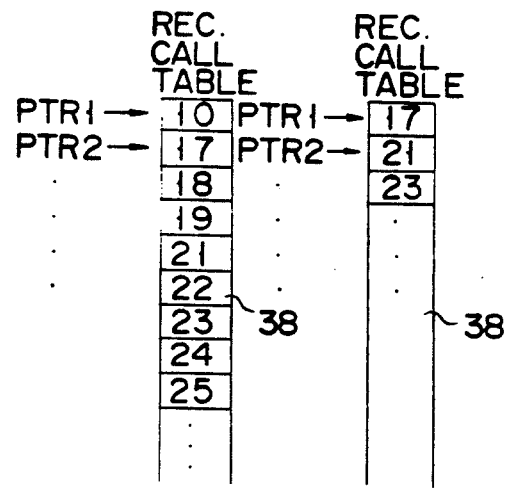
FIG. 14   FIG. 15
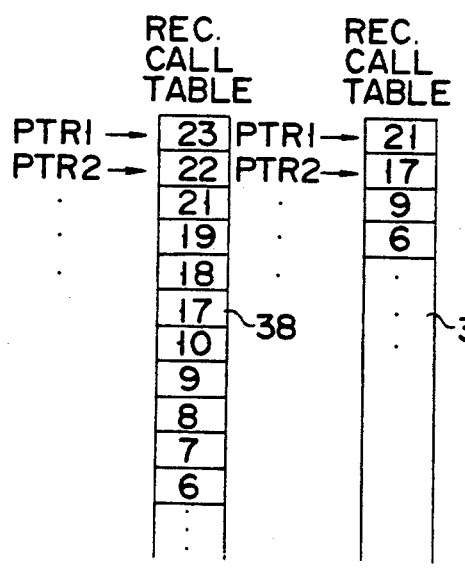
FIG. 16   FIG. 17
FIG. 12
FIG. 13

HIGH-SPEED SEARCH SYSTEM FOR IMAGE DATA STORAGE

BACKGROUND OF THE INVENTION

1. Field of the Invention

The present invention relates to an image-searching system such as an image data filing system, for recording, searching for, and processing image data.

2. Description of the Related Art

In recent years, image data filing systems have been put to practical use. Each of these systems reads image data items from a number of documents by scanning the documents by means of a scanner, records the data items on an optical disk, searches for a desired item of the image data recorded on the disk, reproduces the desired image data item from the disk, and displays the reproduced data item by means of, for example, a CRT display or prints it by means of a printer.

With the system it is possible to perform a high-speed page-flipping and a high-speed file-flipping. In other words, the CRT display displays the pages of image data contained in each file, and also the first pages of files, one after another at high speed.

Neither the page-flipping nor the file-flipping can be started at once when the CRT display displays an image searched for and reproduced from the optical disk. To initiate the page- or file-flipping, the operator needs to perform a complex keyboard operation, spending much time.

More specifically, the operator must operate the keyboard, thereby displaying a list of files on the screen of the CRT display, again operate the keyboard, thereby designating a desired file or a desired page, further operate the keyboard, thus selecting the page- or file-flipping mode, and operate the keyboard for the fourth time, thereby designating the range of search.

In view of this, the conventional filing system has a low efficiency.

SUMMARY OF THE INVENTION

Accordingly, a first object of the invention is to provide an image-searching system which enables an operator to search for a desired image at high speed, while another image is being displayed, and which therefore operates at high efficiency.

It is a second object of the invention to provide an image-searching system which simultaneously displays images in a plurality of display areas on a display screen, while another image is being displayed in the other display area, thereby enabling an operator to search for a desired image at high speed.

To achieve the above first object, an image data search system of the invention comprises: means for storing a plurality of images, each of the images being identified by search information data and a image number wherein each image is defined as a numbered page, with one or more of the pages constituting a numbered file, and with one or more of the files being stored in the storing means; first control means, responsive to specified search information data, for selecting each of the files which correspond to the specified search information data; means for selecting one or more target images to be searched in accordance with the file number and page number of the files selected by the first control means; means for searching the storing means for the target image selected by the selecting means in accordance with an image number, which image number is defined by the page number and the file number of the target image; means for displaying the images searched by the searching means; means for designating the manner of presentation of the images by the display means; second control means for selecting from the storing means the image number of the images relevant to the searched image based on the manner designated by the designating means, in accordance with the file number of the images selected by the first control means and with the file number and the page number of the image searched for by the searching means; and means for enabling the display means to display the image represented by the image number selected by the second control means.

According to the present invention, the storing means stores the images as well as the corresponding search information. Each of the image is stored as a page, and one or more pages constitute a unit of a file. The first control means selects the file numbers of candidates for an image to be searched according to the indication by the search information data. One image is selected based on the file number and the page number of the selected candidate images. The selected target image is searched from the storing means in accordance with the image number determined by the file and page numbers. The searched image is displayed on the display means. The display of continuous images following the current displayed image is instructed. In response to this instruction, the image numbers of the continuous images subsequent to the searched image are selected based on the file number of the candidate images selected by the first control means and on the file and page numbers of the searched image. The images corresponding to the image numbers thus selected are sequentially displayed o the display circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5, 6, and 7 are also diagrams showing the other image data items retrieved by the system and displayed by the CRT display incorporated in the system;

FIGS. 10A to 10C illustrate file management tables;

FIG. 12 illllustrates a detailed file management table;

FIG. 13 is a diagram showing the numbers of the files stored in the main memory illustrated in FIG. 2; and FIGS. 14 to 17 are diagrams representing recordnumber retrieving tables.

DETAILED DESCRIPTION OF THE PREFERRED EMBODIMENTS

An embodiment of the present invention will now be described with reference to the accompanying drawings.

Figure 1:
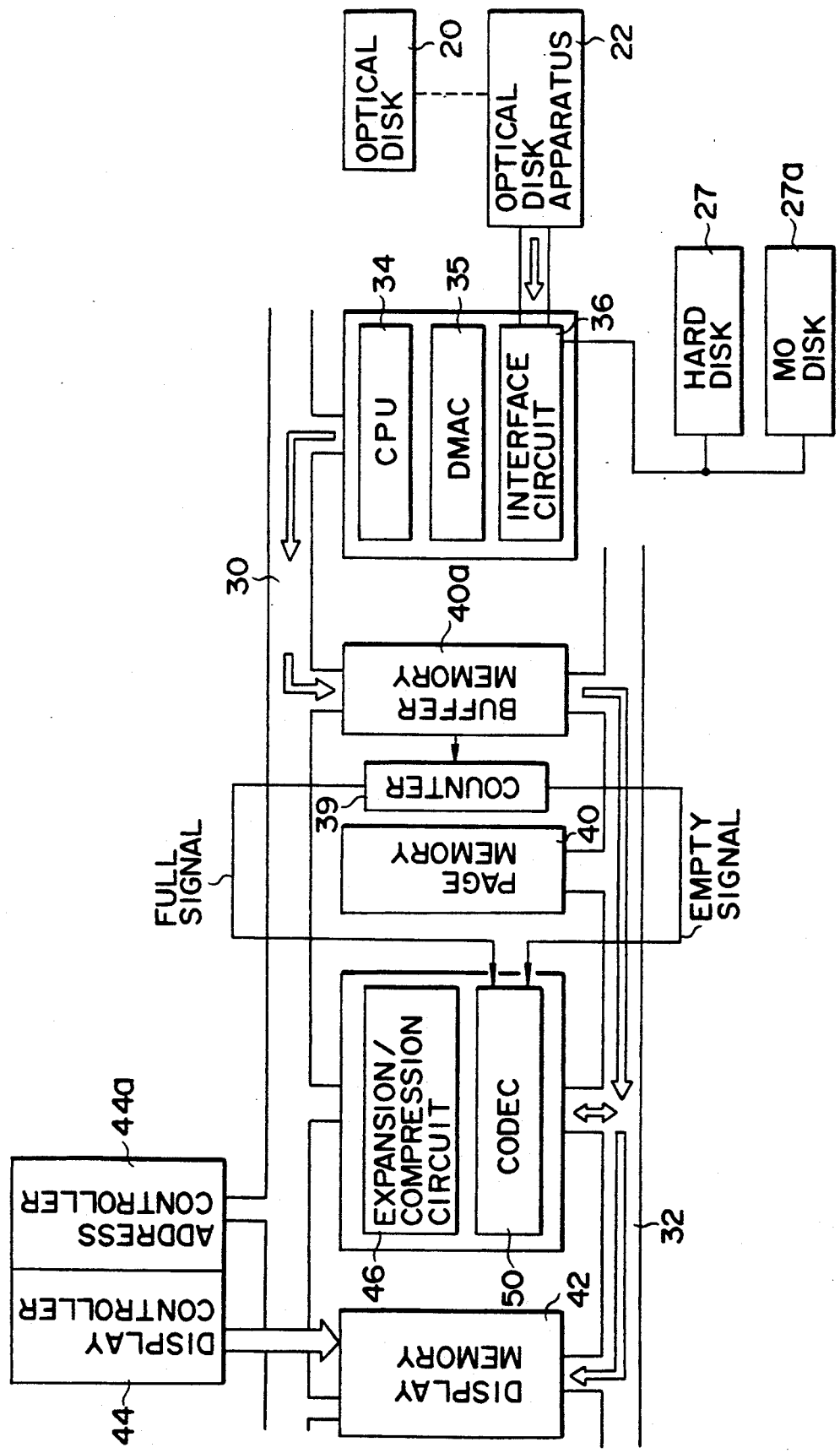
FIG. 1 is a block diagram illustrating the hardware of an image-data searching system according to an embodiment of the present invention.
Figure 2:
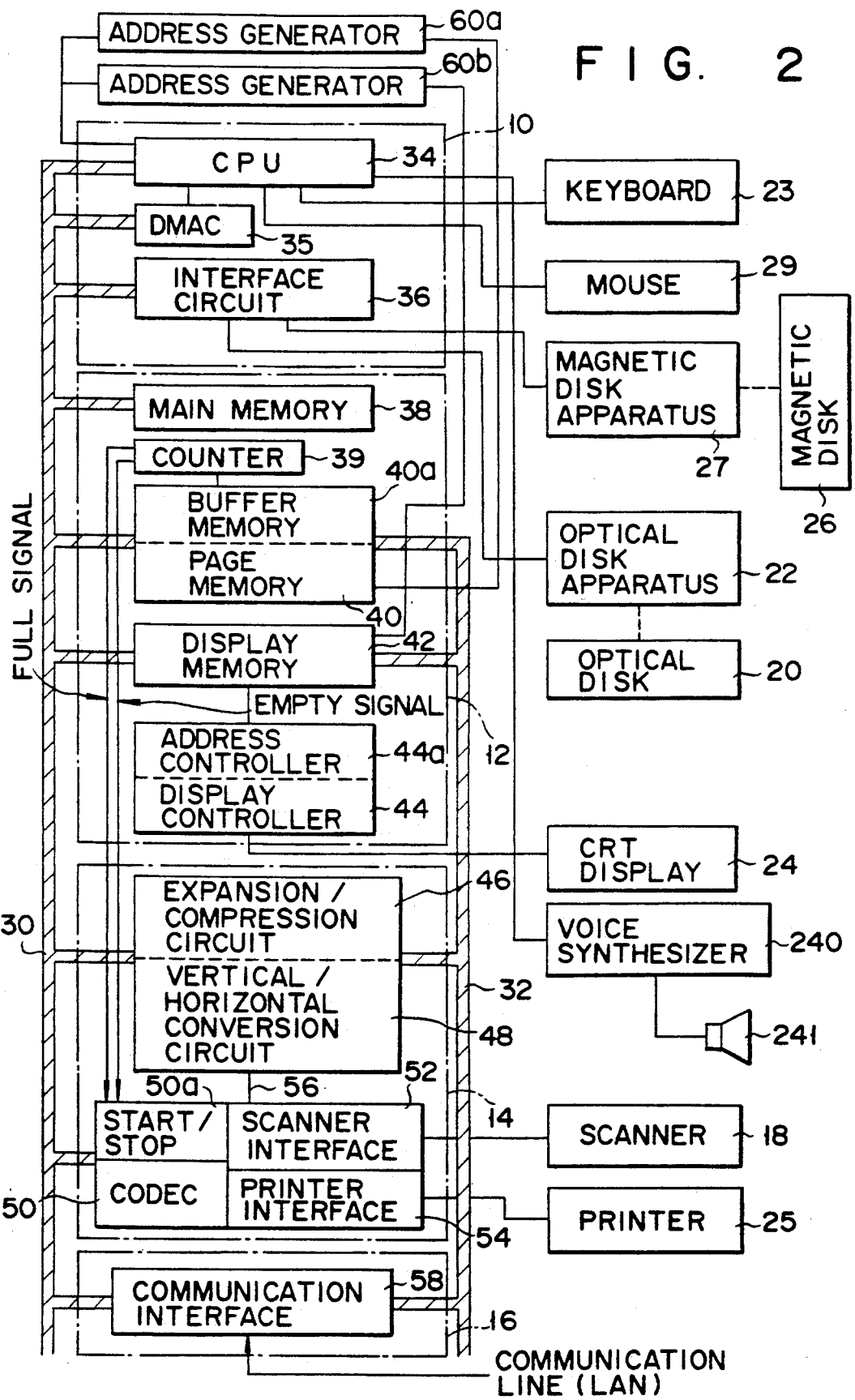
FIG. 2 is a block diagram showing in detail a part of the hardware illustrated in FIG. 1.

FIGS. 1 and 2 illustrates an image data search system according to the invention, such as an electronic filing system.

As is shown in FIG. 2, the electronic filing system comprises a control module 10, a memory module 12, an image processing module 14, a communication control module 16, a scanner 18, an optical disk 20, an optical disk apparatus 22, a keyboard 23, a CRT display 24, a printer 25, a magnetic disk apparatus 27, a magnetic disk 26 or an MO disk 27a, a mouse 29, a system bus 30, and an image-data bus 32.

Control module 10 has a CPU 34, a DMAC (Direct Memory address Controller) 35, and an interface circuit 36. CPU 34 performs various controls for storing image data into a memory, retrieving image data therefrom, and editing image data. DMAC 35 is designed to control the transfer of image data. Interface circuit 36 connects optical disk apparatus 22 and magnetic disk apparatus 27 to CPU 34. Keyboard 23 and mouse 29 are connected to CPU 34.

Memory module 12 comprises a main memory 38, a page memory 40, a display memory 42, a display controller 44, and address generators 60a and 60b. Main memory 38 stores various programs for controlling the storing of image data, the retrieving of image data, the editing of image data, and also stores management data. Page memory 40 functions as an image memory and has a storage capacity great enough to store an A4-size page of image data. Both display memory 42 and display controller 44 are used as a display interface. Address generator 60a generates addresses which will be used in page memory 40, and address generator 60b generates addresses which will be used in display memory 42.

Page memory 40 includes a buffer memory 40a. Image data is written into, and read from, buffer memory 40a, in units of bytes, under the control of a counter 39 which counts one-byte writing pulses supplied from DMAC 35. Counter 39 outputs an empty signal when buffer memory 40a is empty of image data, and a full signal when buffer memory 40a is filled up with image data. The empty signal and the full signal are supplied to start/stop circuit 50a incorporated in a compression/expansion circuit (CODEC) 50. Page memory 40 is designed to store for some time the image data to be recorded on, for example, optical disk 20, or the image data reproduced therefrom.

Display memory 42 is used to store for some time the image data which CRT display 24 will display. More specifically, memory 42 stores the image data to be displayed in a window on the screen of CRT display 24, for example, the image data read from page memory 40, or the data read from buffer memory 40a and processed, thus representing an enlarged image, a reduced image, a rotated image, or a combined image, or a white-to-black reversed image. Display controller 44 controls CRT display 24, in cooperation with an address control circuit 44a connected to it.

Let us assume that the CRT display 24 is to display four pages of image data, one after another, thus performing page-turning (later described). In this case, display memory 42 stores these four pages of image data in its storage areas 42a, 42b, 42c and 42d, respectively, as is illustrated in FIGS. 3A to 3E.

As is evident from FIG. 2, image-processing module 14 has an expansion/compression circuit 46, a vertical/horizontal conversion circuit 48, a coding/decoding circuit (CODEC) 50, a scanner interface 52, a printer interface 54 and an internal bus 56. Circuit 46 processes image data into data representing an enlarged image or a reduced image. Conversion circuit 48 processes image data into data representing a rotated image. CODEC 50 encodes image data to compress the data, and also decodes image data to expand the data. Scanner interface 52 is connected to the scanner 18. Printer interface 54 is connected to printer 25. Bus 65 connects expansion/compression circuit 46, vertical/horizontal conversion circuit 48, the CODEC 50, scanner interface 52, and printer interface 54.

CODEC 50 can compress and expand image data in MH (modified Huffman) mode, MR (Modified Read) mode, or the like.

Communication control module 16 comprises a communication interface 58 such as a BCP (Bus Communication Processor) which is connected to, for example, a LAN (Local Area Network). Control module 16 may include a UCP (Universal Communication processor) which can be connected by an interface to an external device such as a FCP (Facsimile Connecting Periphery) or a personal computer.

System bus 30 is provided for supplying control signals to the other components of the image data search system; it connects control module 10, memory module 12, image-processing module 14, and communication control module 16. Image bus 32 connects memory module 14 and communication control module 16.

Scanner 18 is, for instance, a two-dimensional scanning device for scanning an original (i.e., a document) with a laser beam in the vertical and the horizontal directions, and generating electric signals representing the image on the original.

Optical disk apparatus 22 is designed to record on the optical disk 20 the image data which scanner 18 has read from the original, and also to retrieve the data designated by operating keyboard 23 or the like from optical disk 20.

Keyboard 23 is operated to input the names of the image data items recorded on optical disk 20 and also various operation commands, such as record commands, retrieve commands, or edit commands. Mouse 29 has a push button (not shown) and is operated to move a cursor on the screen of CRT display 24 in both the horizontal direction and the vertical direction. When the cursor is moved to a desired position, the operator depresses the push button, thereby to input data identified by the position and representing an operation mode, a region of the image data to be edited, or an icon.

CRT display 24 operates to display the image read by scanner 18 or the image represented by the data retrieved from optical disk 20. It has a rectangular display screen. On the upper, lower, left, and right edges of this screen, icons or the like are displayed.

Figure 4A:
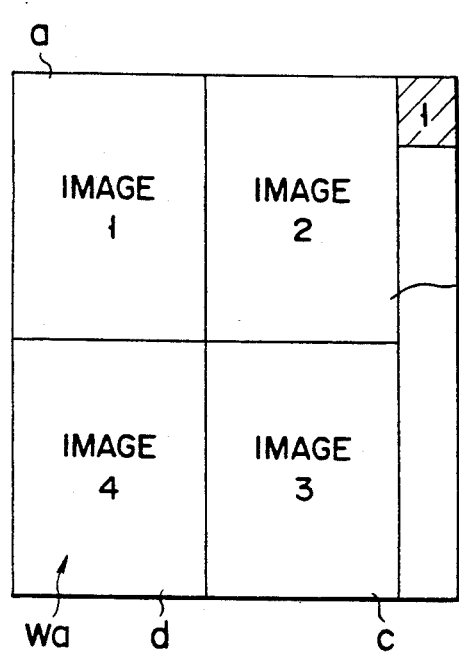
FIGS. 4A and 4B are diagrams representing the image data items retrieved by the system and displayed by the CRT display in the system.
Figure 5:
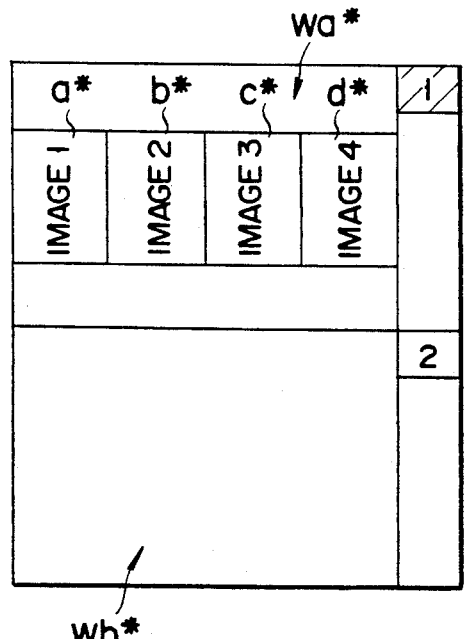
Figure 6:
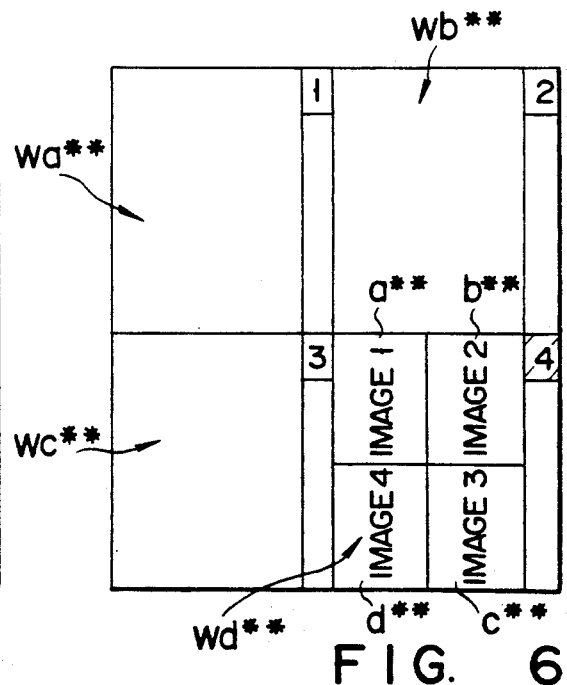

CRT display 24 is of the multi-window type, capable of simultaneously displaying four windows. In other words, it can display only one window as is shown in FIG. 4A, two windows as is illustrated in FIG. 5, and four windows as is illustrated in FIG. 6. A window may display more than one image. Further, CRT display 24 can display each image enlarged, reduced, rotated, or scrolled, independently of any other image simultaneously displayed. The number of images to be displayed at the same time can be changed by operating keyboard 23 or mouse 29.

When a multi-image display mode, e.g., a 4-image display mode is selected while the image data search system is set to the page-turning mode, and if the one-window display mode is selected, one window Wa is divided into four display areas a, b, c, and d, as is shown in FIG. 4A, and four independent images are displayed in areas a, b, c, and d. When CRT display 24 is set to the two-window display mode while the system is set to the page-turning mode, the selected one of two windows Wa* and Wb*, e.g., window Wa*, is divided into four display areas a*, b*, c*, and d*, as is illustrated in FIG. 5, and four independent images are displayed in areas a*, b*, c* and d*. When CRT display 24 is set to the four-window display mode while the system is set to the page-turning mode, the selected one of four windows Wa, Wb, Wc, and Wd, e.g., window Wd, is divided into four display areas a, b, c, and d, as is illustrated in FIG. 6, and four independent images are displayed in areas a, b, c and d**.

Figure 4B:
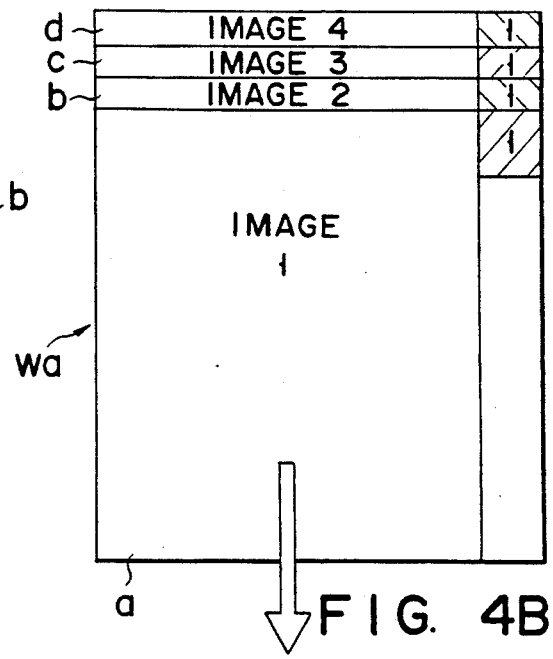

FIG. 4B is a diagram representing another window-display mode, wherein the display area on CRT display 24 is comprised of four stacked display areas a, b, c, and d, each having a substantial full-screen size. These four display areas are located one above another. Images 1, 2, 3, and 4 in these areas a, b, c, and d, respectively, are scrolled downwards. As display area a containing image 1 gradually moves from the uppermost display area, display area b containing next image 2 expands into its full size and is displayed in the uppermost display area. As the images are scrolled downward and displayed in this manner, the operator sees them, as if they were cards being turning up. Images 1 to 4 can be scrolled repeatedly, they appear in full size in the uppermost display area. (The images can also be scrolled upwards. Further, images 1, 2, 3, and 4 displayed in the areas can be scrolled either leftwards or rightwards.)

Each image displayed in FIG. 4B is nearly four times larger than each image shown in the window of FIG. 4A. In view of this, the window display mode shown in FIG. 4B is suitable for the searching of complex images such as similar but not identical mask-patterns of printed circuit boards.

Figures 8, 9:
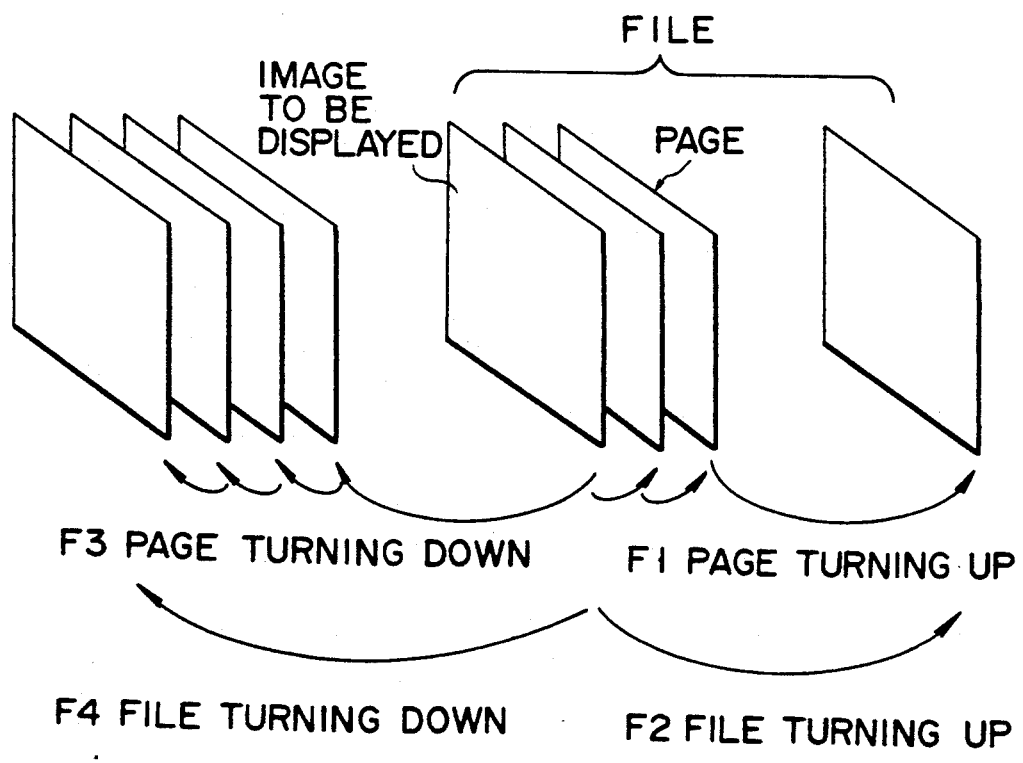
FIG. 8 is a diagram showing the function keys of the CRT display shown in FIG. 2.
FIG. 9 is a diagram explaining how the image-data search system performs upward page-turning, upward file-turning, downward page-turning, and downward file-turning.

As is shown in FIGS. 7 and 8, the functions assigned to the ten function keys F1 to F10 of keyboard 23 are displayed on the lower edge portion of the display window Wa.

As can be seen from FIG. 7, the function of turning pages up is assigned to the function key F1 the function of turning files up is assigned to function key F2; the function of turning pages down is assigned to key F3; the function of turning files down is assigned to key F4; the function of confirming any page or file recognized is assigned to key F6; the printing any selected image is assigned to key F7; the function of displaying four images is assigned to key F8, and the function of cancelling any image selected is assigned to key F10.

When page-flipping such as turning pages up is selected, as is shown in FIG. 8, function keys F1, F2, F3, F4, and F9 are activated as "page turning up", "file turning up", "page turning down", "file turning down", and "stop", respectively, and the key portion corresponding to the selection is reverse-displayed.

The term "page turning up" indicates that when a search is performed in the current files being run, a high-speed display in units of a page starts from the image currently displayed and proceeds in the order of pages and files, as will be seen from FIG. 9.

The term "file turning up" indicates that when the search is performed in the current files being run, a high-speed display in units of a file (the first page only) starts from the first page image of the subsequent file which is next to the image currently displayed, as will be seen from FIG. 9. This high-speed display can also start form the first page of the file corresponding to the currently searched for image.

The term "page turning down" indicates that when the search is performed in the current files being run, a high-speed display in units of a page starts from the image currently displayed and proceeds in the reverse order of pages and files, as will be seen from FIG. 9.

The term "file turning down" indicates that when the search is performed in the current files being run, a high-speed display in units of a file (the first page only) starts from the first page image of the file which precedes the image currently displayed, as will be seen from FIG. 9. This high-speed display can also start from the first page of the file corresponding to the current searched for image.

With reference to FIGS. 1 and 2, it will now be explained where in display memory 42 the data items representing four images are stored so as to be displayed on the four display areas, respectively, in the page- or file-turning mode.

First, the data representing image 1 is searched for and read from optical disk 20 and is then stored into buffer memory 40a. This data is supplied from memory 40a to the expansion/compression circuit 46. Circuit 46 processes the data into one showing a reduced image 1. The data of image 1 (reduced image), thus processed, is written into display memory 42, in memory area 42a which corresponds to the display area a and whose address the CPU has designated in accordance with the output of address control circuit 44a connected to display controller 44.

Then, the data representing image 2, stored into buffer memory 40a, is processed by expansion/compression circuit 46 into data showing a reduced image 2. The data of image 2, thus processed, is written into display memory 42, in memory area 42b which corresponds to the display area b and whose address the CPU has designated in accordance with the output of address control circuit 44a.

Next, the data representing the image 3, stored into buffer memory 40a, is processed by circuit 46 into data showing a reduced image 3. The data of image 3, thus processed, is written into display memory 42, in memory area 42c which corresponds to the display area c and whose address the CPU has designated in accordance with the output of address control circuit 44a.

Further, the data representing the image 4 stored into buffer memory 40a, is processed by circuit 46 into data showing a reduced image 4. The data of image 4, thus processed, is written into display memory 42, in memory area 42d which corresponds to the display area d and whose the address the CPU has designated in accordance with the output of address control circuit 44a.

Thereafter, the data items representing the image 5, 6, 7, . . . are similarly stored into memory areas 42a, 42b, 42c, . . .

The stored data items in memory areas 42a, 42b, 42c, and 42d are respectively displayed at display areas a, b, c, and d of CRT display 24 in accordance with the operation of display controller 44.

Thus, the reduced images 1, 2, 3, . . . are displayed on the display areas a, b, c, . . . of CRT display 24, and the pages of the reduced images are then subjected to, e.g., the page turning up procedure.

Printer 25 prints the image read by scanner 18, the image searched for and reproduced from disk 20, or the image being displayed at CRT display 24, thereby providing a hard copy of the image.

Magnetic disk apparatus 27 has magnetic disk 26 set in it, and records various control programs on magnetic disk 26. It also records on disk 26 search information (the name of the desired image data), input by operating keyboard 23, and search data items such as the address data representing that address of optical disk 20 at which the desired image data corresponding to the search information is stored, the data representing the size of the desired image data, and the frequency of searching the desired image data The names of image data items and the search data items are controlled in accordance with a file management table. As is shown in FIGS. 10A to 10C, this table is formed of three subtables, i.e., a title management table 26a, a page management table 26b, and a record management table 26c.

Recorded in title management table 26a are file numbers each of which correspond to search information (file name) consisting of a plurality of search keys.

Each record number is stored in page management table 26b in units of a page of each file. In other words, record numbers respectively corresponding to the pages are stored in table 26b.

Recorded in record management table 26c for each record number are: the stored address of image data in optical disk 20 (i.e., the memory start position), the file size (i.e., the image's size), the attributes of the images (e.g., image-compression scheme, the image-resolutions, etc.), and the frequency of searching the images (i.e., the image-accessing frequency).

The stored addresses are logic addresses. A physical track address and a physical sector address are computed from them.

The file management system employed in this embodiment has a 4-level hierarchical structure. The four levels are: the cabinet level, the binder level, the file level, and the page level. The information of one cabinet is stored in one side of optical disk 20. One cabinet can contain eight binders at most. Each binder can contain up to 30,000 files. The files of each binder are given different titles, and the file structure is defined in units of a binder. The file constitutes a basic unit and may contain comments (explanations of the file). Each file can contain 4,095 pages at most.

It will now be explained how the electronic filing system, described above, records image data items and searches for any desired one of these image data items.

To record an image on optical disk 20, the operator operates keyboard 23, thereby setting the system to the record mode. Then, he or she operates keyboard 23, thereby inputting the name of the image (search information), which is defined by a plurality of search keys previously set. The name of the image is input to CPU 34.

CPU 34 determines whether or not the image name accords with the format prescribed in conformity with the specifications of the filing system. If the search data is input in the prescribed format, CPU 34 determines whether or not the input image name is identical to the any image which has already recorded on optical disk 20. If the input image is not identical to the names of the images already recorded on disk 20, the input image name is stored into main memory 38.

Next, the operator sets an original having the image in scanner 18, and CPU 34 drives scanner 18 and optical disk apparatus 22. Scanner 18 scans the original in the horizontal and vertical directions, converting the image into electric signals. These signals form line data items. The line data items are sequentially stored into page memory 40. These data items are stored into display memory 42 and supplied to CRT display 24. CRT display 24 displays the image read from the original.

The operator checks the conditions of the image displayed, such as skew, density, and resolution. If he or she finds these conditions satisfactory, he or she depresses a record key (not shown) on keyboard 23. Then, CPU 34 reads the line data items from page memory 40, one after another, and supplies them to CODEC 50. CODEC 50 encodes and decodes the line data items in the known MR (modified Read) scheme, thus providing data showing a compressed image. The image data thus provided is supplied to optical disk apparatus 22. Apparatus 22 records this image data on optical disk 20.

After the image data has been recorded on optical disk 20, CPU 34 stores the physical track address at which image data is recorded, the logical address determined by physical sector address, the size of the image, defined by the length of the image data block, the attributes of the image, and the like, into main memory 38, in association with the search code (search information). Further, CPU 34 supplies the data showing the image name to magnetic disk apparatus 27. Magnetic disk apparatus 27 records the image name in title management table 26a, page management table 26b, and record management table 26c (FIGS. 10A, 10B, and 10C)—all provided on magnetic disk 26.

It will now be explained how any image data, thus recorded on optical disk 20, is searched for, with reference to the flow chart shown in FIG. 11A.

First, a search mode is set by key board 23, and then the search information corresponding to the image data to be searched is input thereby (ST1). CPU 34 sequentially compares the input search information with each search information stored in the title management table 26a (FIG. 10A) of magnetic disk 26, checks whether or not information identical to the input search information exists, and picks up each file number matching the input search information (ST2). Then CPU 34 stores the picked up file numbers in main memory 38, as is shown in FIG. 13, for example (ST3).

CPU 34 refers to the candidate file numbers in the main memory 38, and prepares a list of the desired files (search information) using data read from title management table 26a. The list thus prepared is displayed at CRT display 24 (ST4). If the operator cannot find the file(s) to be searched from the displayed list, he or she can re-input the search information. If the file(s) is found there, the operator selects (e.g., by the file number) the image to be searched from the displayed list, so that the search starts (ST5).

CPU 34 reads the record number corresponding to the selected image, using the page management table 26b (FIG. 10B or FIG. 12) in magnetic disk 26, and then reads the logical address corresponding to the read record number from record management table 26c (FIG. 10C) in magnetic disk 26. CPU 34 calculates the physical track address as well as the physical sector address corresponding to the above logical address. Reproduction of image data from optical disk 20 is carried out by optical disk apparatus 22 in accordance with the above calculated addresses (ST6).

CPU 34 supplies CODEC 50 with image data (compressed data) of each scan line sent from optical disk apparatus 22. Data expanded by CODEC 50 is subsequently supplied to page memory 40. The image stored in page memory 40 is subjected to reduction processing in expansion/compression circuit 46, and the reduced image is sent to display memory 42. Memory 42 then stores the reduced image, and display controller 44 displays the contents of display memory 42 within the window Wa on CRT display 24, as is illustrated in FIG. 7 (ST7).

In the search display mode as mentioned above, when confirmation key F6 is selected using key board 23 or mouse 29 (ST8; yes), the control of CUP 34 returns to step ST1. When page turning up key F1 is selected (ST10; yes), CPU 34 executes the operation of turning the next page up. When file turning up key F2 is selected (ST11; yes), CPU 34 executes the operation of turning the next file up. When page turning down key F3 is selected (ST12; yes), CPU 34 executes the operation of turning the prior page down. When file turning down key F4 is selected (ST13; yes), CPU 34 executes the operation of turning the prior file down. When print key F7 is selected (ST14; yes), CPU 34 executes the print operation. When screen display mode switching key F8 is selected (ST15; yes), CPU 34 executes the screen mode switching operation. When cancel key F10 is selected (ST9; yes), CPU 34 terminates the process of searching FIG. 11G is a flow chart for explaining the screen mode switching operation of step ST15. CPU 34 responds to an instruction of the screen mode switching, and detects the current screen mode in the active window. In other words, CPU 34 determines whether the current screen mode is a 1-screen mode or a 4-screen mode (ST110). When the current screen mode is the 1-screen mode, the 4-screen mode is selected for a new display mode (ST111), so that display areas a, b, c, and d for the four screens are set at CRT display 24, and each frame of these four areas is displayed. CPU 34 further changes the indication of function key F8 from the 4-screen mode to the 1-screen mode, and the indication of function key F9 from "x" to "select" (ST112).

In response to the selection of key F9, CPU 34 selects one of the four screens to be active (ST113; yes). Then, the display area to be used in the selected screen is designated by key board 23 or mouse 29 (ST114), and the display mode using the designated display area is selected (ST115). After all, the process returns to confirming steps ST8-ST15 in FIG. 11A.

For instance, if display areas a, b, and c are selected for the active screens in the four screens of window Wa shown in FIG. 4A, the searched images are sequentially displayed in the selected display areas a, b, and c. More specifically, image 1 is displayed at area a, image 2 is displayed at area b, image 3 is displayed at area c, and then image 4 will be displayed at first area a.

In step ST110, if the current display is in the 4-screen mode, CPU 34 selects the 1-screen mode (ST116), so that one screen display area a is set at CRT display 24 and the frame of area a is displayed. Then, CPU 34 changes the indication of function key F8 from the 1-screen mode to the 4-screen mode, and the indication of function key F9 from "select" to "x" (ST117). After this, the process returns to confirming steps ST8-ST15 in FIG. 11A.

Figure 11A:
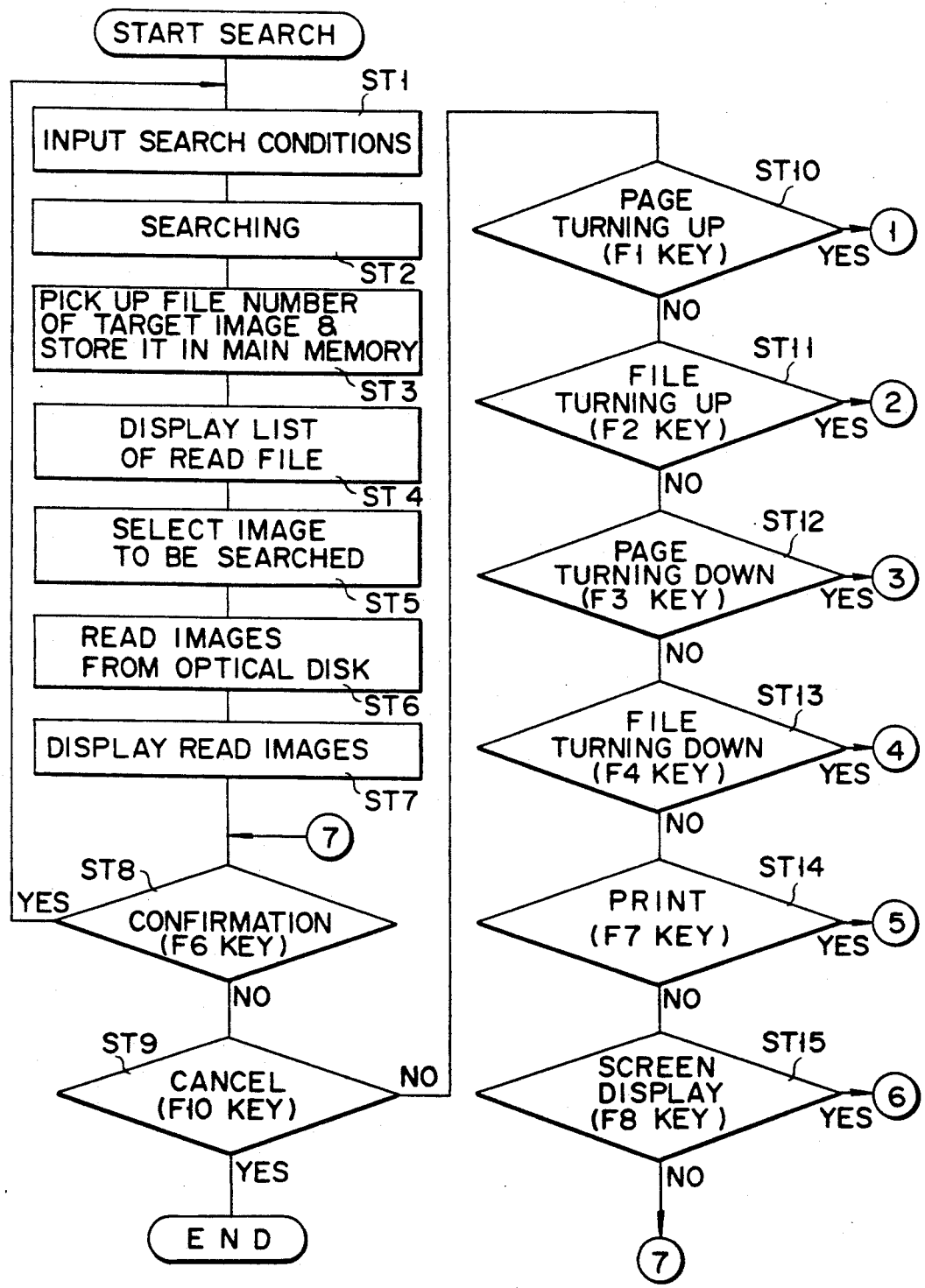
FIGS. 11A to 11G form a flow chart explaining a method of searching image data, according to the present invention.
Figure 11B:
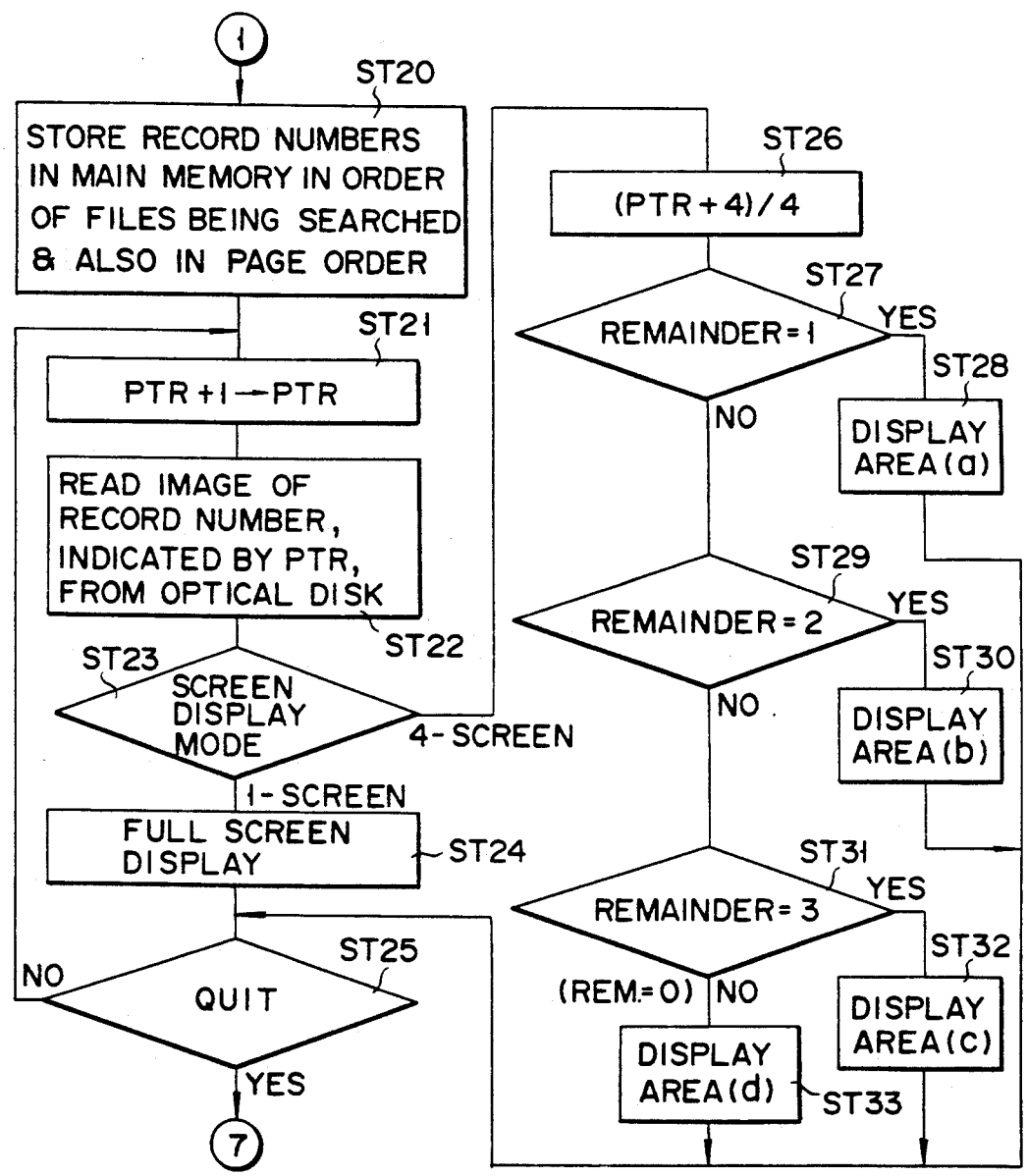
Figure 11C:
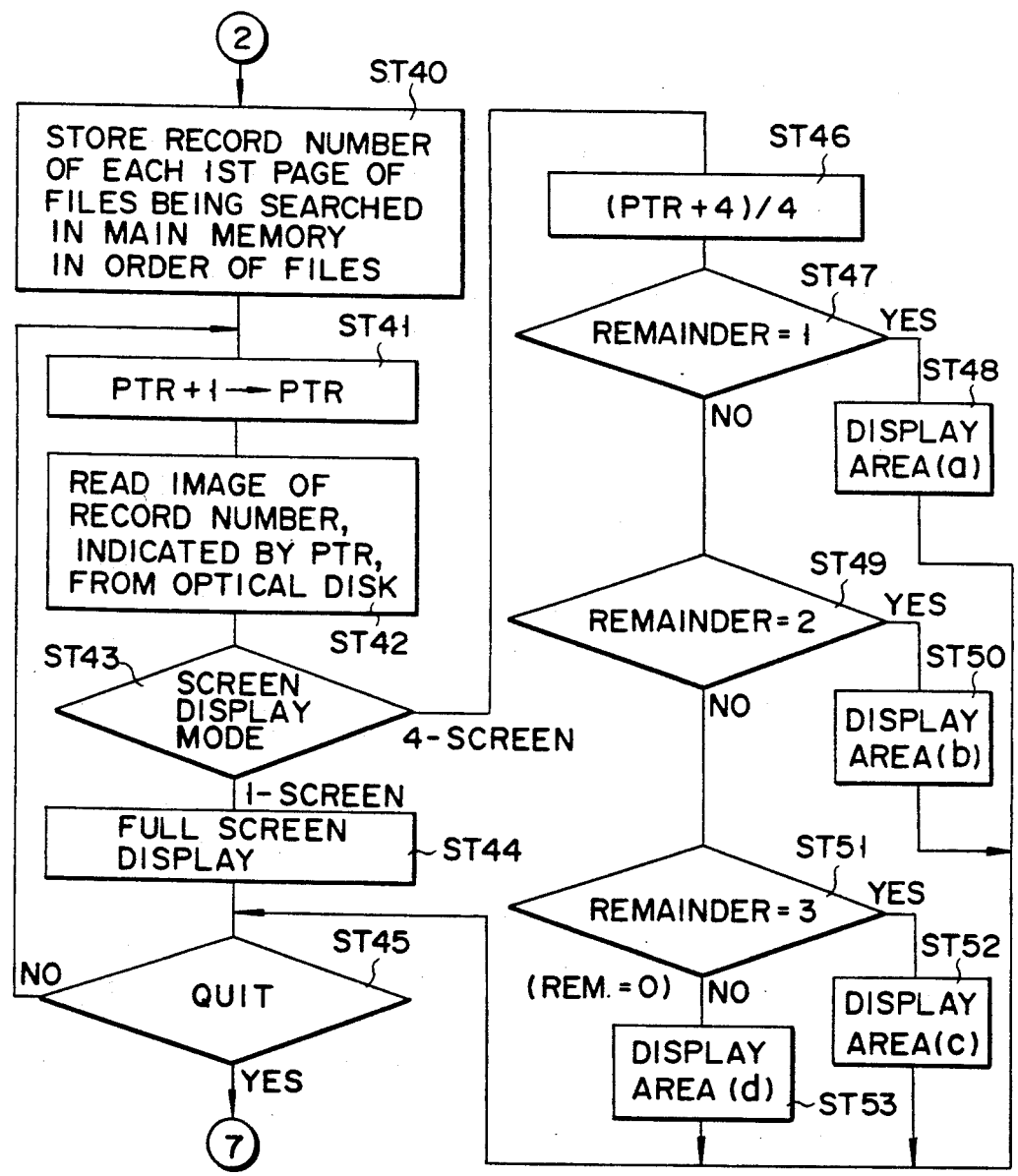
Figure 11D:
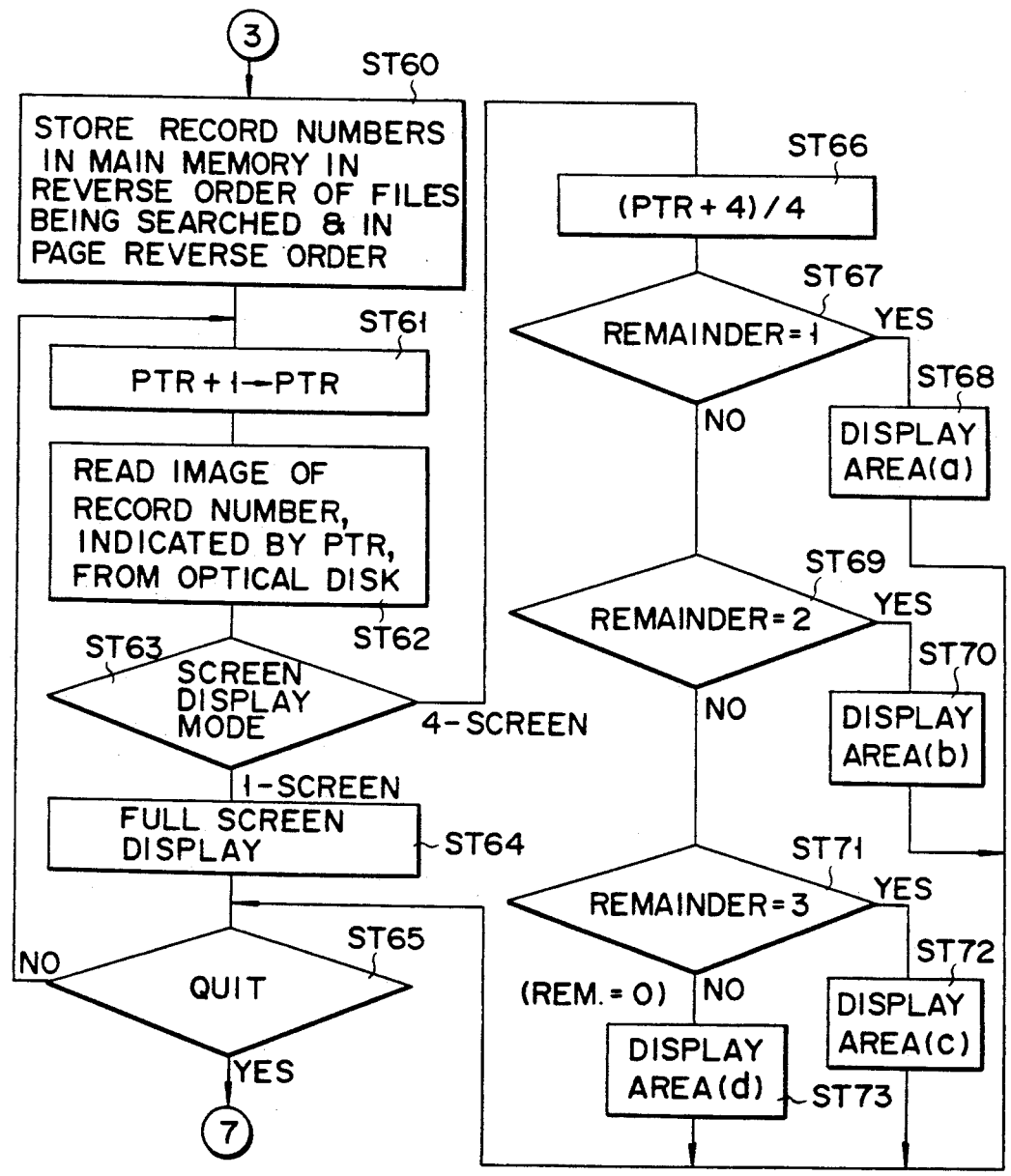
Figure 11E:
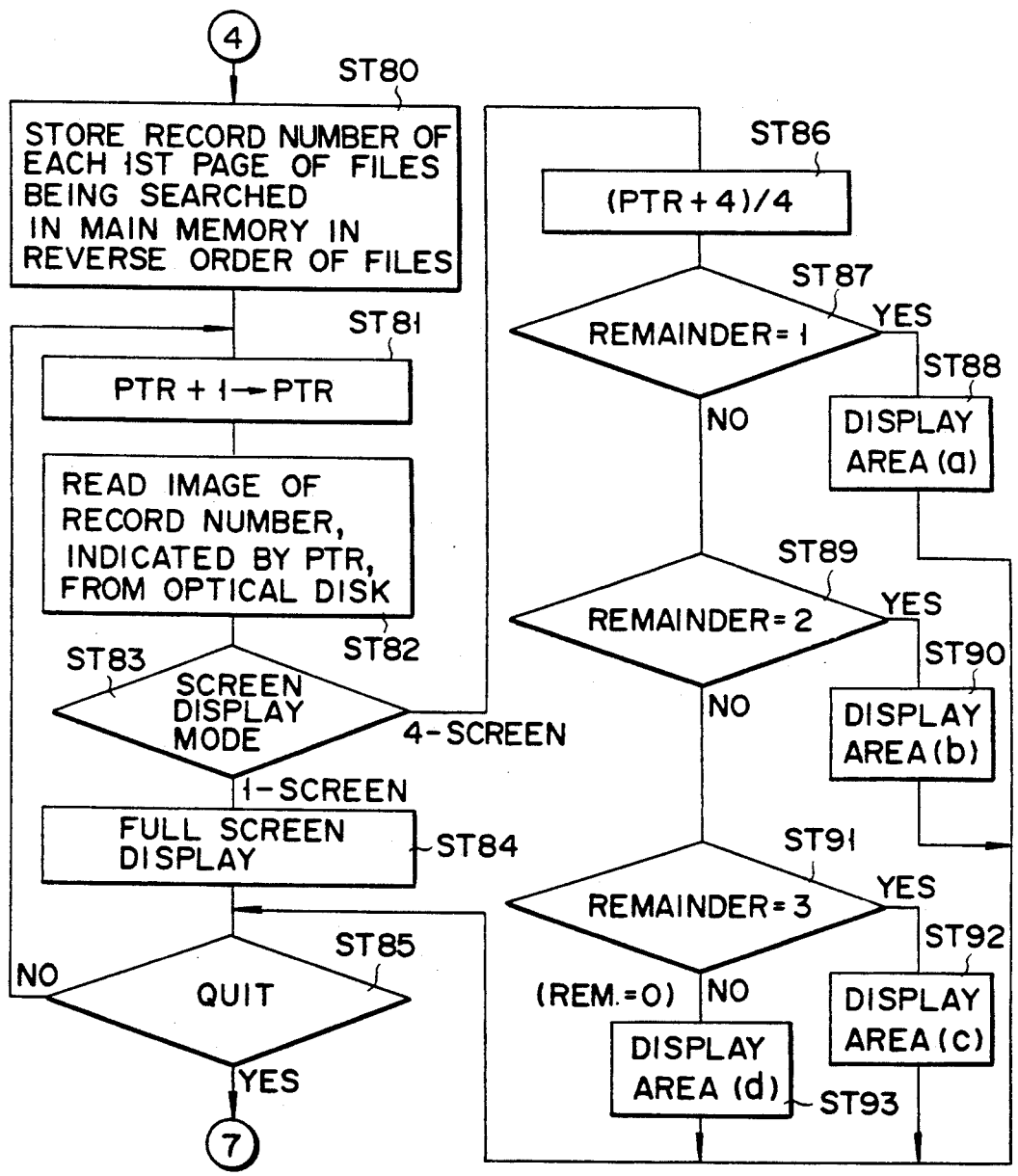
Figures 11F, 11G:
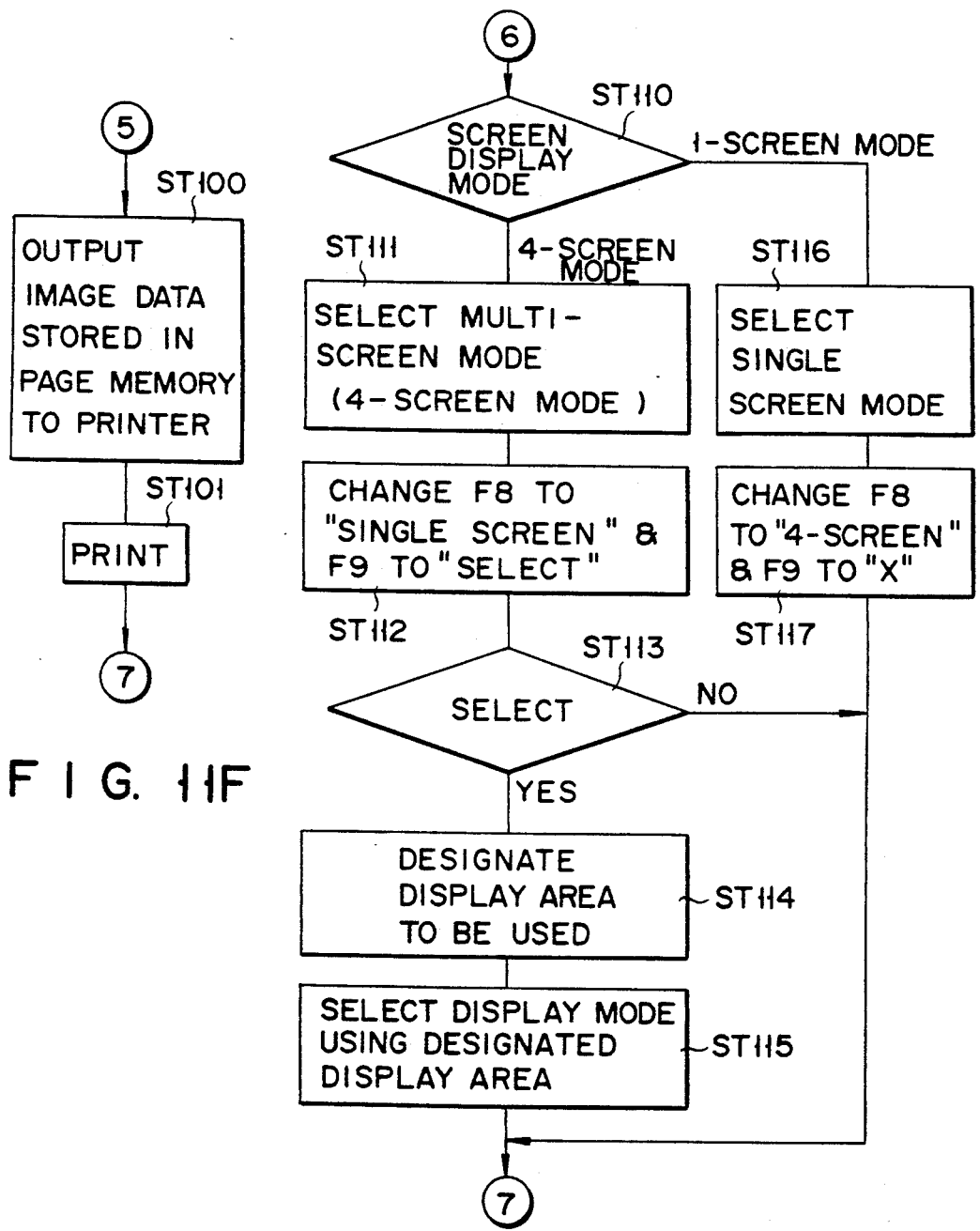

FIG. 11F is a flow chart for explaining the printing operation of step ST14 in FIG. 11A. CPU 34 in FIG. 2 responds to an instruction to print, and the image data stored in page memory 40 is supplied to printer 25, via image bus 32, internal bus 56, and printer interface 54 (ST100). Then, printer 25 prints the supplied image data (ST101).

FIG. 11B is a flow chart for explaining the page turning up operation of step ST10 in FIG. 11A. In response to the instruction for turning a page up CPU 34 refers to the candidate file numbers stored in main memory 38 (cf. FIG. 13), the file numbers currently displayed for searching, and the record numbers, and CPU 34 picks up all pages having file numbers to be searched, as well as their record number information, from page management table 26b in magnetic disk 2 (cf. FIG. 12). The picked up data of the pages and the record number information is then stored in main memory 38.

Subsequently, CPU 34 prepares in main memory 38 a record call table containing the record numbers which are arranged in an increasing order, as is shown in FIG. 14 (ST20). More specifically, from the top position of the record call table, the record numbers in units of a page are sequentially arranged starting from the record number currently displayed for searching.

CPU 34 sets the value "1" in pointer PTR which is used for scanning the record call table (ST21). CPU 34 reads from the record call table the record number "10" corresponding to the pointer="1" (FIG. 14). CPU 34 reads from record management table 26c (FIG. 10C) in magnetic disk 26 the logical address data corresponding to the record number "10", and calculates the physical track address as well as the physical sector address corresponding to the read log cal address of record number "10". Using the above addresses thus obtained, reproduction of the desired image information in optical disk 20 is performed by optical disk apparatus 22 (ST22).

Associated with the above operation, CPU 34 determines whether the display mode is to be the 1-screen mode or the 4-screen mode (ST23). When the display mode is the 1-screen mode, an image is displayed in current active window Wa using the full display area thereof (ST24).

In short, CPU 34 supplies CODEC 50 with image data (compressed data) of each scanning line delivered from optical disk apparatus 22, and the supplied image data is subjected to data expansion processing. The expanded image data is reduced by expansion/compression circuit to fit with the display size of window Wa, and the reduced image data is supplied to display memory 42 in turn. Thereafter, the image data stored in display memory 42 is displayed at CRT display 24.

The program sequence of CPU 34 returns to step ST21, and the value of pointer PTR is incremented from "1" to "2" CPU 34 reads from the record call table the record number "17" corresponding to the pointer="2" (FIG. 14). CPU 34 reads from record management table 26c in magnetic disk 26 the logical address data corresponding to the record number "17", and calculates the physical track address as well as the physical sector address corresponding to the read logical address of record number "17". Using the above addresses thus obtained, reproduction of the desired image information in optical disk 20 is performed by optical disk apparatus 22, and the reproduced image is displayed at CRT display 24 (ST22–ST24).

Thereafter, each time CRT display 24 displays image information, pointer PTR is incremented by "+1" so that the images of the subsequent pages are sequentially displayed.

When the 4-screen mode is detected at step ST23, CPU 34 determines which display area (a, b, c, or d) in the current active window Wa is to be used, in accordance with the value of pointer PTR. When each display area to be used in the 4-screen mode is determined, four blocks of information reproduced from optical disk 20 are stored at memory areas 42a, 42b, 42c, and 42d in display memory 42, respectively corresponding to display areas a, b, c, and d. Then, images of the reproduced four information blocks are displayed at four display areas a, b, c, and d, respectively (ST26–ST33).

Figures 3A, 3B:
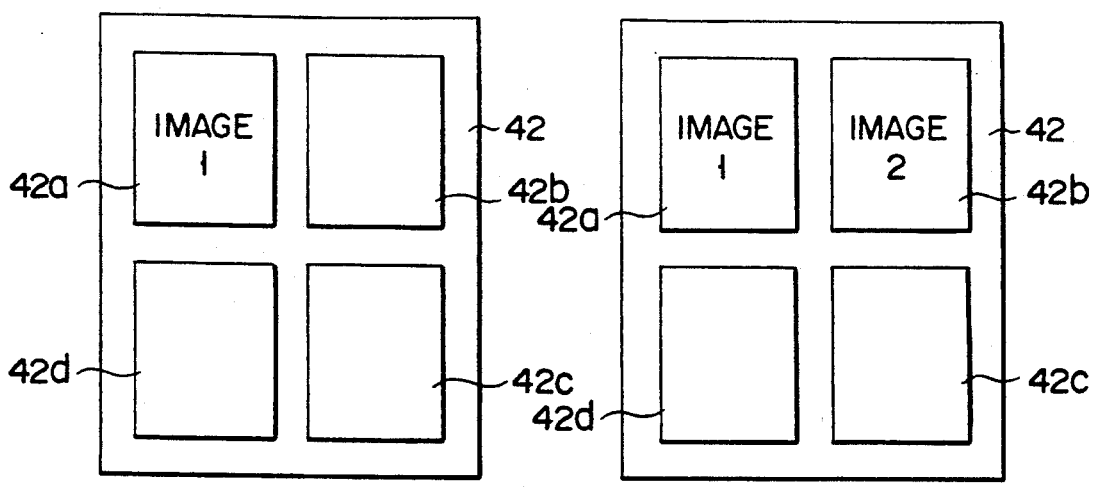
FIGS. 3A to 3E are diagrams explaining which image data items are stored in the display memory shown in FIG. 1.
Figures 3C, 3D:
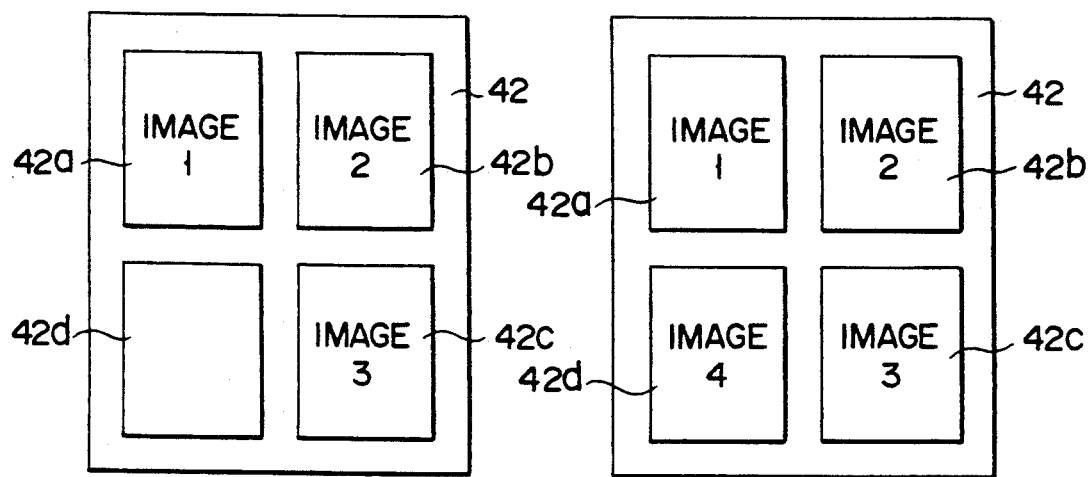
Figure 3E:
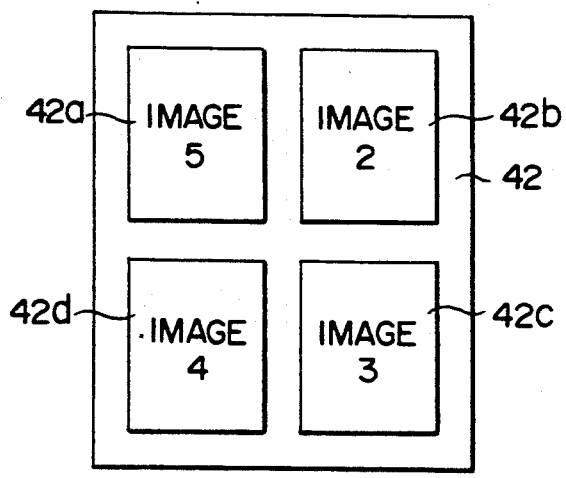

In step ST26, division calculation of (PTR+4)/4, and the remainder of the result of the division is checked. The remainder is "1" when pointer PTR="1" (ST27; yes). In this case, image 1 is stored at memory area 42a in display memory 42 (FIG. 3A), and image 1 is displayed at display area a (ST28). When pointer PTR="2", the remainder becomes "2" (ST29; yes). In this case, image 2 is stored at memory area 42b in display memory 42 (FIG. 3B), and image 2 is displayed at display area b (ST30). When pointer PTR="3", the remainder becomes "3" (ST31; yes). In this case, image 2 is stored at memory area 42c in display memory 42 (FIG. 3C), and image 3 is displayed at display area c (ST32). When pointer PTR="4", the remainder becomes "0" (ST31; no). In this case, image 4 is stored at memory area 42d in display memory 42 (FIG. 3D), and image 4 is displayed at display area d (ST33). If pointer PTR="5", the remainder becomes "1"0 (ST27; yes), so that image 5 is overwritten in memory area 42a in display memory 42 (FIG. 3E). In this case, image 1 is erased and image 5 is displayed at display area a (ST28).

In the same manner, the images of each page are displayed at the four display areas in the order of b, c, d, a, b, . . .

When the page turning up operation is terminated during this operation, the program sequence of CPU 34 returns to the process confirmation state of steps ST8–ST15 in FIG. 11A.

FIG. 11C is a flow chart for explaining the file turning up operation of step ST11 in FIG. 11A. In response to the instruction for turning a file up, CPU 34 refers to the candidate file numbers stored in main memory 38 (cf. FIG. 13), the file numbers currently displayed for searching, and the record numbers, and CPU 34 picks up each first page of the file numbers to be searched, as well as its record number information, from page management table 26b in magnetic disk 26 (cf. FIG. 12). The picked up data of the pages and the record number information is then stored in main memory 38.

Subsequently, CPU 34 prepares in main memory 38 a record call table containing the record numbers which are arranged in the increasing order, as is shown in FIG. 15 (ST40). More specifically, from the top position of the record call table, the record numbers in units of a page are sequentially arranged starting from the record number currently displayed for searching.

Thereafter, CPU 34 performs the file turning up operation in the same manner as in the case of the page turning up operation (cf. ST21–ST53 in FIG. 11B). More specifically, the images to be searched are sequentially displayed in unit of a file, starting from the first page of the file next to the currently displayed one (ST41–ST53).

FIG. 11D is a flow chart for explaining the page turning down operation of step ST12 in FIG. 11A. In response to the instruction for turning page down, CPU 34 refers to the candidate file numbers stored in main memory 38 (cf. FIG. 13), the file numbers currently displayed for searching, and the record numbers, and CPU 34 picks up all pages having file numbers to be searched, as well as their record number information, from page management table 26b in magnetic disk 26 (cf. FIG. 12). The picked up data of the pages and the record number information is then stored in main memory 38.

Subsequently, CPU 34 prepares in main memory 38 a record call table containing record numbers arranged in a decreasing order, as is shown in FIG. 16 (ST60). More specifically, from the top position of the record call table, the record numbers in units of a page are sequentially arranged starting from the record number currently displayed for searching.

Thereafter, CPU 34 performs the page turning down operation in the same manner as in the case of the page turning up operation (cf. ST21–ST53 in FIG. 11B). More specifically, the images to be searched are sequentially displayed backward in units of a page, starting from the page preceding the currently displayed one (ST61–ST73).

FIG. 11E is a flow chart for explaining the file turning down operation of step ST13 in FIG. 11A. In response to the instruction for turning file down, CPU 34 refers to the candidate file numbers stored in main memory 38 (cf. FIG. 13), the file numbers currently displayed for searching, and the record numbers. CPU 34 picks up each first page of the file numbers to be searched, as well as its record number information, from page management table 26b in magnetic disk 26 (cf. FIG. 12). The picked up data of the pages and the record number information is then stored in main memory 38.

Subsequently, CPU 34 prepares in main memory 38 a record call table containing the record numbers which are arranged in the decreasing order, as is shown in FIG. 17 (ST80). More specifically, from the top position of the record call table, the record numbers in units of a page are sequentially arranged starting from the record number currently displayed for searching.

Thereafter, CPU 34 performs the file turning down operation in the same manner as in the case of the page turning up operation (cf. ST21–ST53 in FIG. 11B). More specifically, the images to be searched are sequentially displayed in units of a file, starting from the first page of the file prior to the currently displayed one (ST81-ST93).

Although the above explanation is directed to the operation of a one-window display, the operation of two- or four-window displays is carried out similar to the one-window case. In the two- or four-window display mode, the page turning up display is performed in the selected window, while the remaining window(s) can be used for displaying next candidate image(s). Thus, when a multi-window display mode is used, it is convenient for an operator to view not only the turned up or turned down images but also other images.

As mentioned above, according to the image data search system of the invention, page-flipping of images, e.g., turning page up, turning file up, turning page down, and turning file down, can be easily performed when desired images are to be searched. In other words, an optional image can be searched with a high-speed display of page-flipping (turning page up, turning file up, turning page down, turning file down, etc.), thereby enhancing the operability of the system.

Figure 11H:
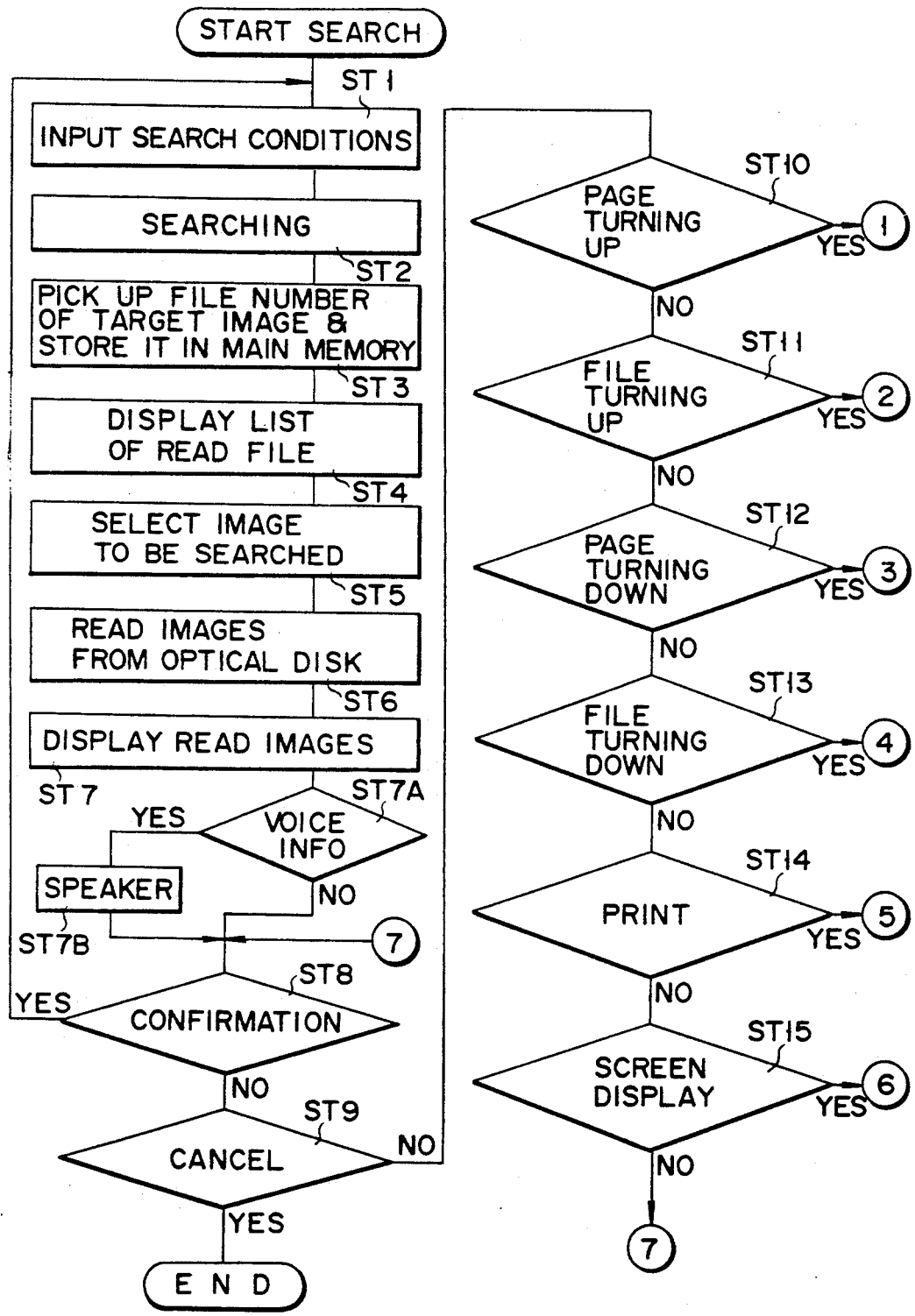
FIG. 11H is a flow chart explaining another method of searching image data, according to this invention.

FIG. 11H is a modification of FIG. 11A, wherein an image searching display mode can be checked not only by a visual manner but also by an audible manner. More specifically, audio processing steps ST7A and ST7B are inserted between step ST7 and step ST8 in the flow of FIG. 11A. Except for these audio processing steps, the flow of FIG. 11H is identical to that of FIG. 11A.

An apparatus for executing the flow of FIG. 11H is provided with a voice synthesizer 240 having a conventional circuit configuration. Synthesizer 240 is coupled to CPU 34 and includes a voice data ROM and a power amplifier. In synthesizer 240, voice data corresponding to the command from CPU 34 is read from the ROM, and the read voice data, converted into an analog voice signal, is amplified by the power amplifier. The amplified voice signal is sent to loudspeaker 241.

Assume that after the display of FIG. 7 is obtained at step ST7 of FIG. 11H, CPU 34 sends command C1 corresponding to key F1 to voice synthesizer 240 (ST7A; yes). Then, speaker 241 says "Do you wish to turn page up?", for example (ST7B). If the operator pushes key F1 of key board 23 in response to the speech from speaker 241 (ST10; yes), the page turning up processing of FIG. 11B starts.

Similarly, in response to command C2 corresponding to key F2, speaker 241 says "Do you wish to turn file up?". If the operator pushes key F2 (ST11; yes), the file turning up processing of FIG. 11C starts. In response to command C3 corresponding to key F3, speaker 241 says "Do you wish to turn page down?". If the operator pushes key F3 (ST12; yes), the page turning down processing of FIG. 11D starts. In response to command C4 corresponding to key F4, speaker 241 says "Do you wish to turn file down?". If the operator pushes key F4 (ST13; yes), the file turning down processing of FIG. 11E starts.

The operator can be audibly informed of the status of confirmation (key F6; ST8), print (key F7; ST14), display mode (key F8; ST15), cancel (key F10; ST9), etc., and continue the subsequent operations.

The electronic filing system according to the invention can perform so-called "circulating page-flipping," in which the images reproduced from optical disk 20 are displayed, four images at a time in the four display areas provided by dividing the current active window.

As has been described, the present invention can provide a system which searches image data at high speed and which can simultaneously display images in a plurality of display areas provided by dividing a display screen.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A high speed search system for an image data storage system, comprising:

storing means for sequentially storing a plurality of images, said storing means including at least one numbered file having a corresponding file number and including at least one numbered page having a corresponding page number and representing one of said plurality of images, each of said images being identified by search information data and an image number;

first control means, responsive to receipt of specified search information data, for selecting numbered files which correspond to the specified search information data;

selecting means for selecting from the numbered files selected by said first control means, at least one target image to be searched, by selecting a file number and page number which correspond to the at least one target image;

searching means for searching said storing means for the at least one target image selected by said selecting means by searching for an image number which includes the page number and the file number which correspond to the at least one target image;

display means for displaying the at least one target image detected by said searching means;

designating means for designating one of a plurality of presentation modes for said display means, wherein the plurality of presentation modes that may be designated by said designating means includes a presentation mode wherein said display means displays images stored in said storing means which sequentially follow the at least one target image displayed by said display means;

second control means for selecting from said storing means an image number of an image included within one of the numbered files selected by said first control means, which is deemed relevant to the at least one target image based on the presentation mode designated by said designating means; and enabling means for enabling said display means to display an image represented by the image number selected by said second control means.

2. A search system according to claim 1, further comprising:

converting means for converting an image display area of said display means from a single display area to a plurality of display areas;

sequential display means for sequentially displaying, on the plurality of display areas of said display means, a plurality of images corresponding to the image numbers selected by said second control means.

3. A search system according to claim 1, further comprising:

converting means for converting an image display area of said display means from a single display area to a plurality of display areas;

second designating means for designating one of the plurality of image display areas;

sequential display means for sequentially displaying, on the one image display area designated by said second designating means, a plurality of images corresponding to the image numbers selected by said second control means.

4. A search system according to claim 1, wherein a plurality of said files constitute a logical binder, and a plurality of said binders constitute a logical cabinet, and wherein said storing means includes a disk recording media having a recording plane in which all image data of said cabinet can be stored.

5. A search system according to claim 1, wherein the plurality of presentation modes that may be designated by said designating means includes a presentation mode wherein said display means displays images stored in said storing means which sequentially follow the at least one target image displayed by said display means.

6. A search system according to claim 1, wherein said second control means selects an image number of an image stored in said storing means sequentially following the at least one target image detected by said searching means.

7. A search system according to claim 1, wherein said designating means includes sound generating means for generating sounds identifying the presentation mode to be used by said display means.

8. A search system according to claim 1, wherein the plurality of presentation modes that may be designated by said designating means includes a presentation mode wherein said display means sequentially displays images with corresponding page numbers in increasing order.

9. A search system according to claim 1, wherein the plurality of presentation modes that may be designated by said designating means includes a presentation mode wherein said display means sequentially displays images with corresponding page numbers in decreasing order.

10. A search system according to claim 1, wherein the plurality of presentation modes that may be designated by said designating means includes a presentation mode wherein said display means sequentially displays images with corresponding file numbers in increasing order.

11. A search system according to claim 1, wherein the plurality of presentation modes that may be designated by said designating means includes a presentation mode wherein said display means sequentially displays images with corresponding file numbers in decreasing order.

12. An image data search system, comprising:
storing means for storing a plurality of images, said storing means including at least one numbered file having a corresponding file number and including at least one numbered page having a corresponding page number and representing one of said plurality of images, each of said images being identified by search information and an image number;

first extraction means for extracting from said storing means a file number corresponding to each file including images having corresponding designated search information;

selecting means for selecting a desired image from images included within each file having a file number extracted by said first extraction means, wherein the desired image is selected by selecting a file number and a page number which correspond to the desired image;

searching means for searching for the desired image in said storing means by searching for a corresponding image number which includes the file number and the page number which correspond to the desired image;

display means for displaying the desired image when the desired image is detected by said searching means;

designating means for designating a display mode for displaying additional images which are included within files having file numbers extracted by said first extraction means;

second extraction means for extracting from said storing means image numbers corresponding to the additional images in accordance with the display mode designated by said designating means; and enabling means for enabling said display means to the sequentially display the additional images corresponding to the image numbers extracted by said second extraction means.

13. An image data search system, comprising:
storing means for storing a plurality of images, said storing means including at least one numbered file having a corresponding file number and including at least one numbered page having a corresponding page number and representing one of said plurality of images, each of said images being identified by search information and an image number;

first extraction means for extracting from said storing means a file number corresponding to each file including candidate images which have corresponding designated search information;

selecting means for selecting a desired image from the candidate images, wherein the desired image is selected by selecting a file number and a page number which correspond to the desired image;

searching means for searching for the desired image in said storing means by searching for a corresponding image number which includes the file number and the page number which correspond to the desired image;

display means for displaying the desired image when the desired image is detected by said searching means;

designating means for designating a display mode for displaying additional candidate images;

second extraction means for extracting from said storing means image numbers corresponding to the additional candidate images in accordance with the display mode designated by said designating means;

converting means for converting a display area of said display means from a single display area to a plurality of display areas; and enabling means for enabling said display means to sequentially display, using said plurality of display areas, the additional candidate images corresponding to the image numbers extracted by said second extraction means.

14. An image data search system, comprising:
storing means for storing a plurality of images, said storing means including at least one numbered file having a corresponding file number and including at least one numbered page having a corresponding page number and representing one of said plurality of images, each of said images being identified by search information and an image number;

first extraction means for extracting from said storing means a file number corresponding to each file including candidate images which have corresponding designated search information;

selecting means for selecting a desired image from the candidate images, wherein the desired image is selected by selecting a file number and a page number which correspond to the desired image;

searching means for searching for the desired image in said storing means by searching for a corresponding image number which includes the file number and the page number which correspond to the desired image;

display means for displaying the desired image when the desired image is detected by said searching means;

first designating for designating a display mode for displaying additional candidate images;

second extraction means for extracting from said storing means image numbers corresponding to the additional candidate images in accordance with the display mode designated by said first designating;

converting means for converting a display area of said display means from a single display area to a plurality of display areas;

second designation means for designating specific display areas of the plurality of display areas to be used; and means for enabling said display means to sequentially display, using the specific display areas designated by said second designation means, the additional candidate images corresponding to the image numbers extracted by said second extraction means, when said display means uses the plurality of display areas.

* * * * *